(12) United States Patent
Taneyhill

(10) Patent No.: US 6,838,871 B2
(45) Date of Patent: Jan. 4, 2005

(54) HIGH TEMPERATURE WHEEL SPEED SENSOR PACKAGE TO ENVELOPE SENSOR IC

(75) Inventor: David J. Taneyhill, Niles, OH (US)

(73) Assignee: Bendix Commercial Vehicle Systems, LLC ( * ) Notice: Subject to any disclaimer, the term of this patent is extended or adjusted under 35 U.S.C. 154(b) by 0 days.

(21) Appl. No.: 10/328,107

(22) Filed: Dec. 23, 2002

(65) Prior Publication Data

US 2004/0119464 A1 Jun. 24, 2004

(51) Int. Cl.[7] .............................. G01P 3/488; G01B 7/30
(52) U.S. Cl. ............... 324/174; 324/207.2; 324/207.21; 324/207.25
(58) Field of Search ..................... 324/207.2, 207.21, 324/207.25, 173, 174, 224, 225

(56) References Cited

U.S. PATENT DOCUMENTS

| | | | | |
|---|---|---|---|---|
| 3,152,303 A | * | 10/1964 | Lary et al. | 324/204 |
| 4,123,707 A | * | 10/1978 | Fujii et al. | 324/207.16 |
| 4,185,265 A | * | 1/1980 | Griffin et al. | 340/905 |
| 4,993,419 A | | 2/1991 | Gaudet, Jr. et al. | |
| 5,070,298 A | * | 12/1991 | Honda et al. | 324/207.2 |
| 5,321,355 A | * | 6/1994 | Luetzow | 324/207.2 |
| 5,483,157 A | * | 1/1996 | Nakatake et al. | 324/174 |
| 5,689,182 A | * | 11/1997 | Togo et al. | 324/207.15 |
| 5,756,894 A | * | 5/1998 | Paolo et al. | 73/489 |
| 5,929,629 A | | 7/1999 | Hiraoka et al. | |
| 6,291,990 B1 | | 9/2001 | Nakane et al. | |
| 6,693,418 B2 | * | 2/2004 | Kubik | 324/174 |

FOREIGN PATENT DOCUMENTS

| | | |
|---|---|---|
| DE | 4341890 A | 10/1985 |
| GB | 2157830 A | 10/1985 |
| JP | 6-82477 A * | 3/1994 |
| JP | 6-82478 * | 3/1994 |
| WO | WO 01/51932 A | 7/2001 |

OTHER PUBLICATIONS

PCT Search Report Dated May 26, 2004, PCT/US03/40874.

* cited by examiner

Primary Examiner—Jay Patidar
Assistant Examiner—Reena Aurora
(74) Attorney, Agent, or Firm—Calfee, Halter & Griswold LLP

(57) ABSTRACT

A system for producing a signal as a function of a rotational speed of a wheel includes an exciter, which includes a plurality of teeth, secured to the wheel. A cover has a first end facing the exciter. An active sensing element is within the cover and positioned away from the first end of the cover by at least about 10% of a total length of the cover. The teeth pass by the first end of the cover and the active sensing element at a rate proportional to the rotational speed of the wheel. The active sensing element producing signals as a function of the rate the teeth pass the active sensing element. An air pocket within the cover maintains the active sensing element below a predetermined temperature.

12 Claims, 3 Drawing Sheets

HIGH TEMPERATURE WHEEL SPEED SENSOR PACKAGE TO ENVELOPE SENSOR IC

STATEMENT REGARDING FEDERALLY SPONSORED RESEARCH & DEVELOPMENT

This invention was not made by an agency of the United States Government nor under contract with an agency of the United States Government.

BACKGROUND OF THE INVENTION

The present invention relates to wheel speed sensors. It finds particular application in conjunction with high temperature wheel speed sensors and will be described with particular reference thereto. It will be appreciated, however, that the invention is also amenable to other like applications.

Wheel speed sensors are used for detecting rotation of wheels on a vehicle. Generally, there are two (2) broad categories into which wheel speed sensors fall (i.e., those employing either active or passive sensors). Active sensors include electronic components that are typically powered by a power source associated with the vehicle. Passive sensors, on the other hand, need no outside power and usually consist of a coil surrounding a magnetic material. Both types of sensors are positioned proximate to a circular shaped element having a plurality of teeth (e.g., an exciter or tone ring), which rotates with the wheel hub.

In order to maximize the signal produced by passive sensors, precise fabrication is required so that, upon assembly, a limited clearance between a pole piece associated with the sensor and the teeth of the tone ring is maintained throughout the rotation of the wheel hub. Such precision tends to complicate the fabrication and assembly process and, furthermore, increase the cost associated with manufacturing and assembling passive sensors. Consequently, active wheel sensors, which do not require the same level of precision during fabrication or assembly, have become more desirable.

However, the electronic components included in active sensors are sensitive to higher ambient temperatures. Although active wheel speed sensors may not require as precise positioning relative to the teeth of the tone ring as passive sensors, active wheel speed sensors still must be positioned relatively close to the tone ring (e.g., on or near a spindle). Under certain conditions, this location on the vehicle tends to experience extremely high temperatures. Until now, there has been no way to maintain the temperature of the electronic components in an active sensor within a predetermined range with high temperatures around the sensor. Therefore, the performance of the electronic components and, consequently, the active sensor, have been negatively affected by high ambient temperatures.

The present invention provides a new and improved apparatus and method which addresses the above-referenced problems.

SUMMARY OF THE INVENTION

In one embodiment, a sensor package for producing a signal in conjunction with an exciter includes an envelope and an active sensing element within the envelope. An air volume within the envelope maintains the active sensing element below a predetermined temperature.

In another embodiment, a transducer includes a housing and an active sensing element within the housing. A magnetic focuser passes electromagnetic waves through the active sensing element. A means is provided for thermally protecting the active sensing element.

In another embodiment, a system for producing a signal as a function of a rotational speed of a wheel includes an exciter, which includes a plurality of teeth, secured to the wheel. A cover has a first end facing the exciter. An active sensing element is within the cover and positioned away from the first end of the cover by at least about 10% of a total length of the cover. The teeth pass by the first end of the cover and the active sensing element at a rate proportional to the rotational speed of the wheel. The active sensing element produces signals as a function of the rate the teeth pass the active sensing element. An air pocket within the cover maintains the active sensing element below a predetermined temperature.

In another embodiment, a method for manufacturing a sensor package for producing a signal in conjunction with an exciter includes placing an active sensing element within envelope. An air volume is formed within the envelope for maintaining the active sensing element below a predetermined temperature.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
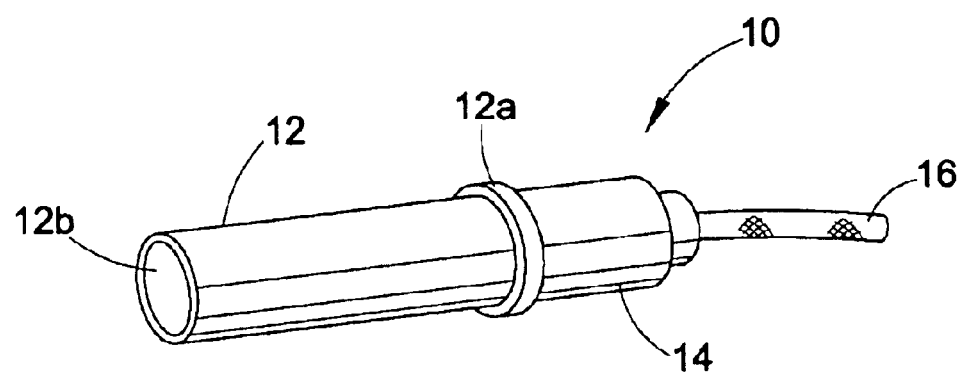
FIG. 1 illustrates a perspective view of a sensor package according to one embodiment of the present invention.

FIG. 1 illustrates a perspective view of a sensor package 10 (transducer) according to one embodiment of the present invention. Although other uses are contemplated, the sensor package 10 is described here as a wheel speed sensor. The package 10 includes a housing 12, which is also referred to herein as an envelope or a cover. A signal transmission means 14 is positioned at a first end 12a of the housing 12; a second end of the housing 12 is referred to as 12b. The signal transmission means 14 includes a communication cable 16, which, in one embodiment, communicates with an anti-lock brake system (ABS) controller (not shown).

Figure 2:
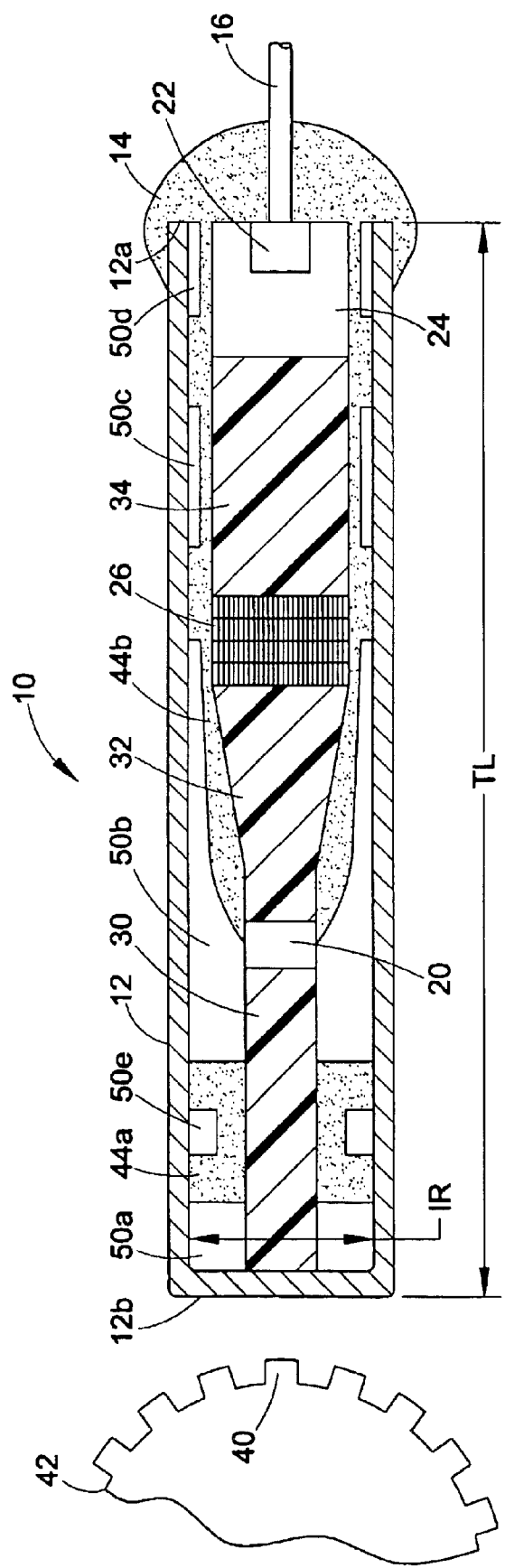
FIG. 2 illustrates a cross-sectional view of the package shown in FIG. 1 in accordance with one embodiment of the present invention.

FIG. 2 illustrates a cross-sectional view of the package 10 shown in FIG. 1. In this embodiment, the housing 12 is formed from a metal. However, other embodiments, in which the housing 12 is formed from other thermal conductive materials (e.g., synthetics), are also contemplated. An active sensing element or device (sensor) 20 (e.g., electronic components typically powered by a power source) is positioned and secured within the housing. In one embodiment, the sensor 20 is an integrated circuit containing Hall Effect magnetoresistive or giant magnetoresistive technologies.

It is to be understood the active sensor 20 receives and transmits signals (e.g., electrical power and data signal) to and from the ABS controller via the cable 16. Furthermore, it is to be understood that the signals are transmitted between the active sensor 20 and the communication cable 16 via additional electrical components 22, which are stored in a volume of space 24 located at the first end 12a of the housing 12 connected to the transmission means 14, and electrical connectors (e.g., wires) (not shown).

A magnet 26 is positioned between the active sensor 20 and the first end 12a of the housing 12. A first magnetism focusing piece 30 is positioned between the second end 12b of the housing 12 and the active sensing device 20. A second magnetism focusing piece 32 is positioned between the active sensing device 20 and the magnet 26. A third magnetism focusing piece 34 is positioned between the magnet 26 and the first end 12a of the housing 12. In one embodiment, each of the focusing pieces is a ferrous material capable of focusing and directing a magnetic path of electromagnetic energy. For example, the first focusing piece 30 directs (focuses) a path of electromagnetic energy from a target 40 to the active sensor 20. In one embodiment, the target 40 is a tooth of an exciter ring 42 (tone ring); however, other types of targets are also contemplated in other embodiments. The second focusing piece 32 directs a path of the electromagnetic energy from the active sensor 20 to the magnet 26. The third focusing piece 34 directs (extends) the path of the electromagnetic energy from the magnet 26 back to the target 40.

A non-ferrous (e.g., synthetic or plastic) support system includes support members 44a, 44b for securing the active sensor 20, magnet 26, first magnetism focusing piece 30, second magnetism focusing piece 32, and third magnetism focusing piece 34 within the housing 12. The support system 44a, 44b is formed and positioned within the housing 12 to provide at least one volume of space 50a, 50b, 50c, 50d, 50e within the housing 12. It is to be understood that the volume of space 50a, 50b, 50c, 50d, 50e may be air, vacuum, and/or any other insulating material.

The at least one volume of air 50a, 50b, 50c, 50d, 50e acts as a means for thermally protecting the active sensor 20. In other words, the volume of air 50a, 50b, 50c, 50d, 50e in the housing 12 is designed to maintain the active sensor 20 below a first predetermined temperature even when the temperature of the housing 12 (ambient temperature) reaches a second predetermined temperature. For example, the air volume 50a, 50b, 50c, 50d, 50e maintains the active sensor 20 below about 165° C. even when the ambient temperature of the cover reaches about 250° C.

In one embodiment, the active sensing element 20 is positioned away from the second end 12b of the housing 12, where the temperature within the sensor package 10 is typically lower. More specifically, the active device 20 is positioned away from the second end 12b by a distance that represents at least ten percent (10%) of the total length TL of the housing 12. Although it is contemplated in this embodiment to position the active device 20 at least 10% of the total length TL from the second end 12b, other embodiments in which the active device 20 is positioned closer to the second end 12b are also contemplated.

Furthermore, it is also contemplated, in one embodiment, that at least one of the air volumes (see 50a, 50b in the illustrated embodiment) includes an inner radius (boundary) ranging from greater than zero percent (>0%) of an inner radius IR of the housing 12 to about sixty percent (60%) of the inner radius IR. At the same time, the air volume includes an outer radius (boundary) ranging from about ten percent (10%) of the inner radius IR to 100% of the inner radius IR.

In the embodiment illustrated in FIG. 2, the first and second ends 12a, 12b of the housing 12 are in a substantially straight line (e.g., aligned about zero degrees 0° relative to each other). A sensor package 10 having the first and second ends 12a, 12b in a substantially straight line are commonly referred to as straight sensors.

Figure 3:
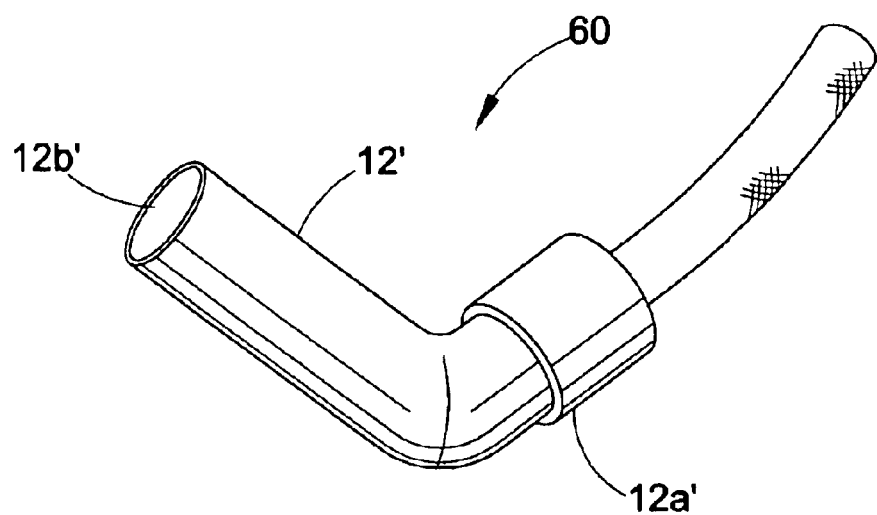
FIG. 3 illustrates a perspective view of a sensor package in accordance with another embodiment of the present invention.

FIG. 3 illustrates a perspective view of a sensor package 60 according to another embodiment. For ease of understanding this embodiment, like components are designated by like numerals with a primed (') suffix and new components are designated by new numerals. The housing 12' is bent to form an angle. In the embodiment illustrated in FIG. 3, the first and second ends 12a', 12b', respectively, of the sensor package 60 are aligned to form an angle of about 90°. It is to be understood that although the sensor package 60 is bent, the various components described above are arranged within the housing 12' to provide an air volume for thermally protecting an active sensing device as discussed above. Although the sensor package 60 is illustrated having an angle of about 90°, other embodiments in which the sensor package is bent to any other angle are also contemplated.

Figure 4:
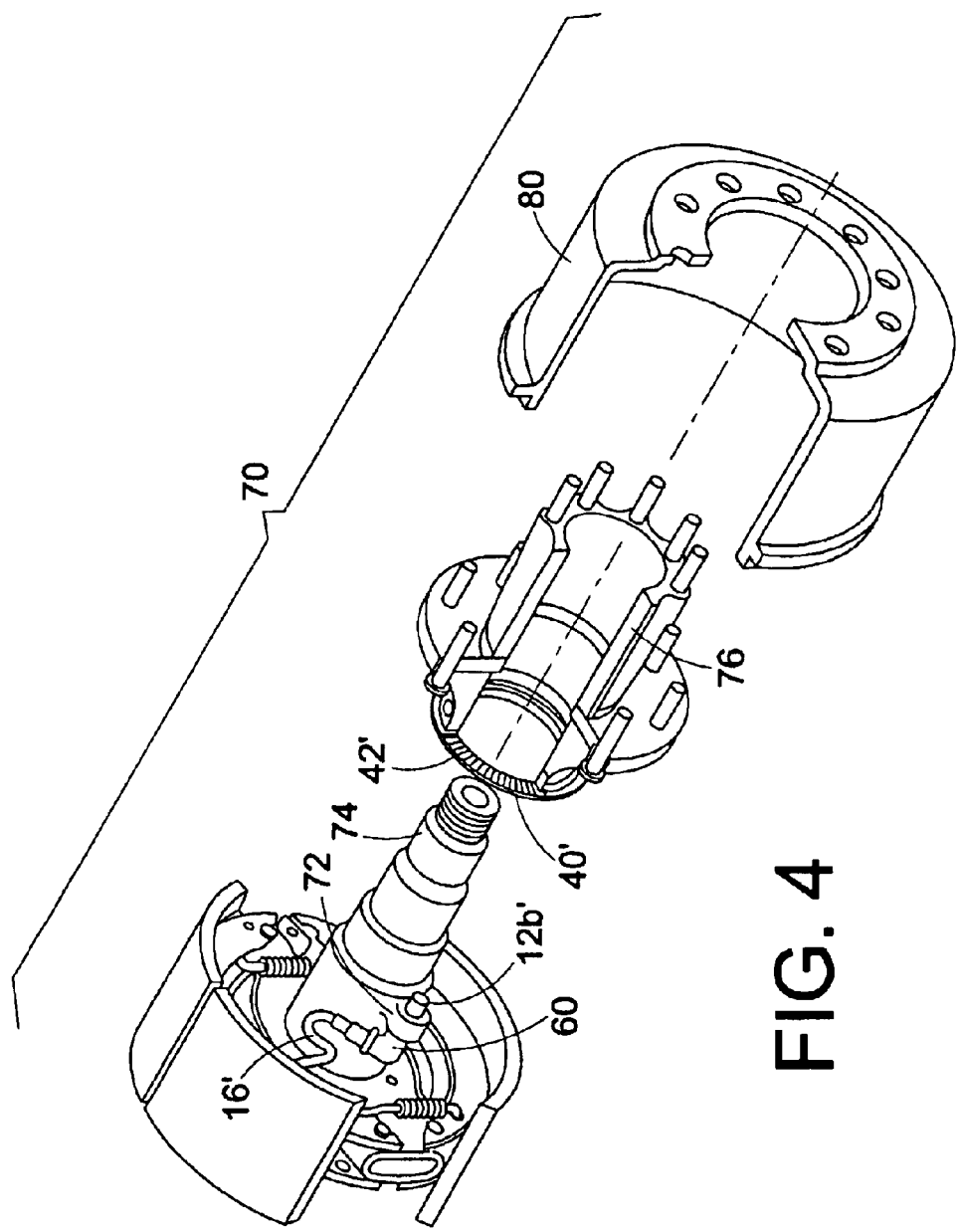
FIG. 4 illustrates an exploded view of the sensor package of FIG. 3 mounted to a wheel assembly in accordance with one embodiment of the present invention.

FIG. 4 illustrates an exploded view of the sensor package 60 mounted to a wheel assembly 70. As shown in FIG. 4, the sensor package 60 is secured in a mounting block 72. The mounting block 72 is typically a stationary component of a vehicle that does not rotate in conjunction with an axle 74 of the wheel assembly 70. The exciter (e.g., tone ring) 42' is mounted to the a hub assembly 76 of the vehicle that does rotate as the axle rotates (and as the vehicle moves). A brake drum 80 covers the hub assembly 76 and mounting block 72. It is understood that the sensor package 60 is positioned so that the active sensor is able to detect rotational movement of the tone ring 42' as the teeth 40' pass by the end 12b'. Signals produced by the active sensor are then transmitted to the ABS controller via the cable 16' for determining rotational speed of the wheel.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A sensor package for producing a signal in conjunction with an exciter, the sensor package comprising:

an envelope;

a magnet within the envelope;

an active sensing element within the envelope; and a first magnetism focusing piece for focusing a magnetic path from the exciter to the active sensing element;

a second magnetism focusing piece for focusing the magnetic path from the active sensing element to the magnet;

a third magnetism focusing piece for extending the magnetic path from the magnet to the exciter; and an air volume within the envelope for maintaining the active sensing element below a predetermined temperature.

2. The sensor package as set forth in claim 1, wherein the active sensing element is positioned away from a first end of the envelope by at least about 10% of a total length of the envelope.

3. The sensor package as set forth in claim 1, wherein:

the air volume has an inner boundary ranging from greater than 0% of an inner radius of the envelope to about 60% of the inner radius; and the air volume has an outer boundary ranging from about 10% of the inner radius to 100% of the inner radius.

4. The sensor package as set forth in claim 1, further including:

at least one non-ferrous support member for supporting the active sensing element, the magnet, and the first, second, and third magnetism focusing pieces within the envelope.

5. The sensor package as set forth in claim 1, further including:

a second air volume at an end of the envelope closest to the third magnetism focusing piece for housing an electronic component communicating with the sensing element.

6. The sensor package as set forth in claim 1, further including:

a signal transmission means at a first end of the envelope farthest from the exciter, the first and second ends of the envelope being in a substantially straight line.

7. The sensor package as set forth in claim 1, further including:

a signal transmission means at a first end of the envelope farthest from the exciter, the first end of the envelope being angled relative to the second end of the envelope.

8. A method for manufacturing a sensor package for producing a signal in conjunction with an exciter, the method comprising:

placing an active sensing element within an envelope;

positioning a magnet within the envelope;

positioning a first magnetism focusing piece for focusing a magnetic path from the exciter to the active sensing element;

positioning a second magnetism focusing piece for focusing the magnetic path from the active sensing element to the magnet;

positioning a third magnetism focusing piece for extending the magnetic path from the magnet to the exciter; and forming an air volume within the envelope for maintaining the active sensing element below a predetermined temperature.

9. The method for manufacturing a sensor package as set forth in claim 8, wherein the placing includes:

positioning the active sensing element away from a first end of the envelope by at least about 10% of a total length of the envelope.

10. The method for manufacturing a sensor package as set forth in claim 8, wherein the forming includes:

forming the air volume to have an inner boundary ranging from greater than 0% of an inner radius of the envelope to about 60% of the inner radius; and forming the air volume to have an outer boundary ranging from about 10% of the inner radius to 100% of the inner radius.

11. The method for manufacturing a sensor package as set forth in claim 8, further including:

positioning at least one non-ferrous support member for supporting the active sensing element, the magnet, and the first, second, and third magnetism focusing pieces within the envelope.

12. The method for manufacturing a sensor package as set forth in claim 8, further including:

forming a first end of the envelope to be at an angle of substantially 90° to a second end of the envelope.

\* \* \* \* \*